United States Patent [19]
Bang

[11] Patent Number: 5,926,333
[45] Date of Patent: Jul. 20, 1999

[54] TECHNIQUE FOR GENERATING SECTOR PULSES BY COMPARING PRODUCTION CLOCK VALUES WITH STORED SECTOR LENGTH VALUE

[75] Inventor: Ho-Yul Bang, Suwon, Rep. of Korea

[73] Assignee: SamSung Electronics Co., Ltd., Suwon, Rep. of Korea

[21] Appl. No.: 08/804,001

[22] Filed: Feb. 21, 1997

[30] Foreign Application Priority Data

Feb. 22, 1996 [KR] Rep. of Korea ..................... 1996-4144

[51] Int. Cl.⁶ ....................................................... G11B 5/09
[52] U.S. Cl. .......................... 360/51; 360/77.08; 395/555
[58] Field of Search ............................... 360/51, 72.1, 75, 360/77.08, 48, 77.03, 78.05; 377/39; 369/49, 50, 32; 711/167, 4; 395/551, 555, 559, 557

[56] References Cited

U.S. PATENT DOCUMENTS

| | | | |
|---|---|---|---|
| 4,757,406 | 7/1988 | Stewart et al. | 360/51 |
| 4,797,757 | 1/1989 | Haitani | 360/77.08 |
| 4,999,720 | 3/1991 | Wilson et al. | 360/48 |
| 5,276,564 | 1/1994 | Hessing et al. | 360/51 |
| 5,307,216 | 4/1994 | Cook et al. | 370/72.1 |
| 5,442,499 | 8/1995 | Emori | 360/77.08 |
| 5,455,721 | 10/1995 | Nemazie et al. | 360/51 |
| 5,479,301 | 12/1995 | Takeuchi | 360/51 |
| 5,506,735 | 4/1996 | Okazaki | 360/75 |
| 5,517,371 | 5/1996 | Takei | 360/77.08 |
| 5,539,795 | 7/1996 | Takase | 377/39 |
| 5,650,882 | 7/1997 | Tsurumi et al. | 360/51 |

*Primary Examiner*—A. Psitos
*Assistant Examiner*—Patrick Wamsley
*Attorney, Agent, or Firm*—Robert E. Bushnell, Esq.

[57] ABSTRACT

A technique for generating sector pulses in a hard disk drive using hardware involves: receiving read reference clocks produced during a read operation of the hard disk drive and producing a byte clock in sync with every byte; outputting the byte clock as an effective production clock in a time interval in which no servo gate signal indicative of a servo zone on a magnetic disk or the hard disk drive is produced, counting the production clocks, and comparing the counted value obtained during the production clock counting step with a previously stored value indicative of a sector length and generating a sector pulse when the counted value is equal to the previously stored value.

10 Claims, 5 Drawing Sheets

TECHNIQUE FOR GENERATING SECTOR PULSES BY COMPARING PRODUCTION CLOCK VALUES WITH STORED SECTOR LENGTH VALUE

CLAIM OF PRIORITY

This application makes reference to, incorporates the same herein, and claims all benefits accruing under 35 U.S.C. §119 from an application Entitled Technique For Generating Sector Pulses earlier filed in the Korean Industrial Property Office on Feb. 22, 1996, and there duly assigned Ser. No. 4144/1996 by that Office.

BACKGROUND OF THE INVENTION

1. Field of the Invention

The present invention relates to a technique for driving a hard disk, and more particularly to a technique for generating sector pulses.

2. Description of the Related Art

Hard disk drives have been widely used for an auxiliary memory which serves as a means for accessing a large quantity of data at a high rate in computer systems. For such hard disk drives, a "constant-density" recording method and a "zone-bit" recording method have been widely used. The constant-density recording method has been proposed by Mark S. Young, "Constant Density Recording Alive With New Chips", Electronic Design, page 141 to page 144. In accordance with the constant-density recording method, all tracks including radial inner tracks and radial outer tracks have substantially the same data density to improve the data capacity of compact disks. In accordance with the constant-density recording method, the data recording area on a magnetic disk is divided into a plurality of zones each having a constant recording density in a radial direction on the magnetic disk. Tracks of different zones are allocated different quantities of data sectors. In particular, tracks of radial outer zones have a larger number of data sectors than those of radial inner zones. On the other hand, the data sectors are substantially the same size irrespective of their positions on the magnetic disk. For this reason, servo sectors of different zones have different quantities of data sectors. The servo sectors are unit sectors each consisting of a servo domain, on which servo information is recorded, and a data sector, on which actual data is recorded. In this regard, the constant-density recording method has been widely used for hard disk drives because it can record a large quantity of information per track on a magnetic disk, as compared with other recording methods.

In a magnetic disk in accordance with the constant-density recording method, one data recording area of the magnetic disk corresponds to one frame. The data recording area is divided into three zones, namely, the first, second, and third zones, and a radial direction. That is, the first to third zones each have five data sectors, four data sectors, and three data sectors corresponding in number to the servo sectors. Here, "frames" means a plurality of areas divided from each track on a magnetic disk and a circumferential direction. Each frame has a certain number of servo sectors. The first frame of each track is called an index frame and the first servo sector of the index frame is called an index sector. The first servo sector of each frame following the index frame is called a servo index sector. Synchronous signals associated with the index sector and servo index sector are called index pulses. When a magnetic disk calls data sectors configured as noted above in the constant-density recording method, those data sectors have different positions and different areas of the magnetic disk. For this reason, it is necessary to provide the signal indicative of a reference position associate with the storing of data recording or readout when an access to the data on the magnetic disk is executed, namely, starting point of each data sector. Such a signal indicative of the starting point of a data sector is called a data sector pulse which hereinafter will be simply referred to as a sector pulse.

Generally, sector pulses are produced using software. A servo gate signal as a signal indicative of a servo zone. When a servo interrupt is generated during a high-level state of the servo gate signal, it is transmitted to an essential processing unit which in turn reads out a sector producing value from a random access memory. The central processing unit downloads the sector producing value in a register included in a sector pulse generating circuit. Under this condition, counting of input sector pulses is carried out from a negative edge of the servo gate signal. When the counter value is equal to the sector producing value, and desired output central pulse is generated.

In hard disk drives, CPU's control the hard disk drives and the production of sector pulses using software. However, CPU's may be overloaded due to the production of sector pulses using software in the case of higher-speed hard disk drive having a larger capacity.

The following patents each disclose features in common with the present invention but do not disclose the specific technique for generating sector pulses in accordance with the present invention as recited in the accompanying claims.

| U.S. Pat. No. | Inventor | Date |
| --- | --- | --- |
| 5,539,795 | Takase | July 23, 1996 |
| 5,517,371 | Takei | May 14, 1996 |
| 5,506,735 | Okazaki | April 9, 1996 |
| 5,479,301 | Takeuchi | December 26, 1995 |
| 5,442,499 | Emori | August 15, 1995 |
| 5,455,721 | Nemazie et al. | October 3, 1995 |
| 5,307,216 | Cook et al. | April 26, 1994 |
| 5,276,564 | Hessing et al. | January 4, 1994 |
| 4,797,757 | Haitani | January 10, 1989 |
| 4,757,406 | Stewart et al. | July 12, 1988 |

SUMMARY OF THE INVENTION

Therefore, an object of the invention is to provide a technique for generating sector pulses in a hard disk drive using hardware.

In accordance with one aspect, the present invention provides a method of generating sector pulses in a hard disk drive, comprising the steps of: receiving read reference clocks produced in a read operation of the hard disk drive and producing a byte clock in sync with every byte; outputting the byte clock as an effective production clock in a time interval in which no servo gate indicative of a servo zone on a magnetic disk of the hard disk drive is produced; counting the production clocks; and comparing the counted value obtained at the production clock counting step with a previously stored value indicative of a sector length and generating a sector pulse when the counted value is equal to the previously stored value.

In accordance with another aspect, the present invention provides a sector pulse producing circuit in a hard disk drive comprising: a disk controller for producing a read gate signal; a read/write channel circuit for receiving the read gate signal from the disk controller and a head signal supplied from a magnetic head of the hard disk drive and for producing encoded read data and read reference clocks based on the received signals; a servo sector address mark detecting circuit for receiving the encoded read data from the read/write channel circuit and for producing a servo address mark signal; an index producing circuit for receiving the servo address mark signal from the servo sector address mark detecting circuit and for producing an index signal; a servo gate producing circuit for receiving a servo address mark signal from the servo sector address mark detecting circuit and for producing a servo gate signal; a byte counter for receiving the read reference clocks from the read/write channel circuit and for producing a byte clock in sync with every byte; a production clock output circuit for outputting the produced byte clock as an effective production clock in a time interval in which no servo gate signal is produced; a production clock counter for counting the production clocks; a controller for producing a value indicative of a sector length of a magnetic disk of the hard disk driver; a first register for receiving the value indicative of the sector length from the controller and for storing it therein; a first comparator for comparing the counted value output from the production clock counting unit with the sector length value stored in the first register; and a sector pulse output circuit for outputting a sector pulse when the two values comparator in the first comparator unit are equal to each other.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following description of the present invention, a detailed description of known functions and configurations incorporated herein has been omitted when it obscures the subject matter of the present invention.

Figure 1:
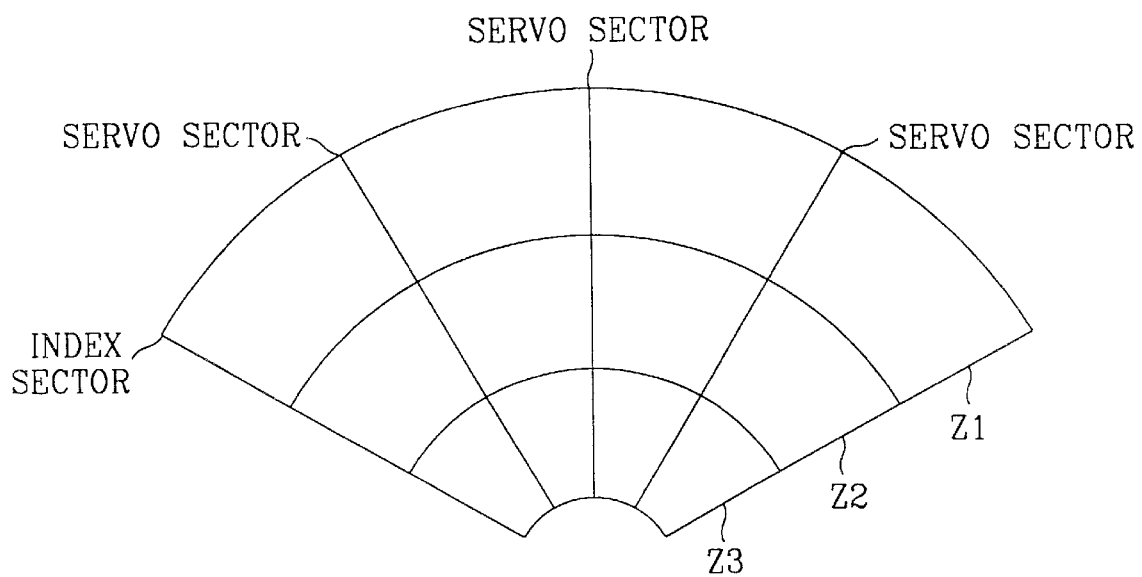
FIG. 1 is a schematic view illustrating a sector format on a magnetic disk in accordance with an earlier constant-density recording technique.

FIG. 1 illustrates an example of a sector format on a magnetic disk in accordance with the constant-density recording method. Referring to FIG. 1, one data recording area of the magnetic disk corresponding to one frame is shown. The data recording area is divided into three zones, namely, the first, second and third zones, Z1 to Z3, in a radial direction, as shown in FIG. 1. This case corresponds to a case wherein each frame has servo sectors. That is, the first to the third zones, Z1 to Z3, each have 5 data sectors, 4 data sectors and 3 data sectors corresponding in number to the servo sectors. Here, "frames" means a plurality of areas divided from each track on a magnetic disk in a circumferential direction. Each frame has a certain number of servo sectors. The first frame of each track is called "an index frame". The first servo sector of the index frame is called "an index sector". The first servo sector of each frame following the index frame is called "a servo index sector". On the other hand, synchronous signals associated with the index sector and servo index sector are called "index pulses".

When a magnetic disk has data sectors configured as shown in FIG. 1, those data sectors have different positions on different areas of the magnetic disk. For this reason, it is necessary to provide a signal indicative of a reference position associated with the starting of data recording or read-out when an access to the data on the magnetic disk is executed, namely, a starting point of each data sector. Such a signal indicative of the starting point of a data sector is generally called "a data sector pulse". Hereinafter, such a data sector pulse is simply referred to as "a sector pulse".

Figure 2:
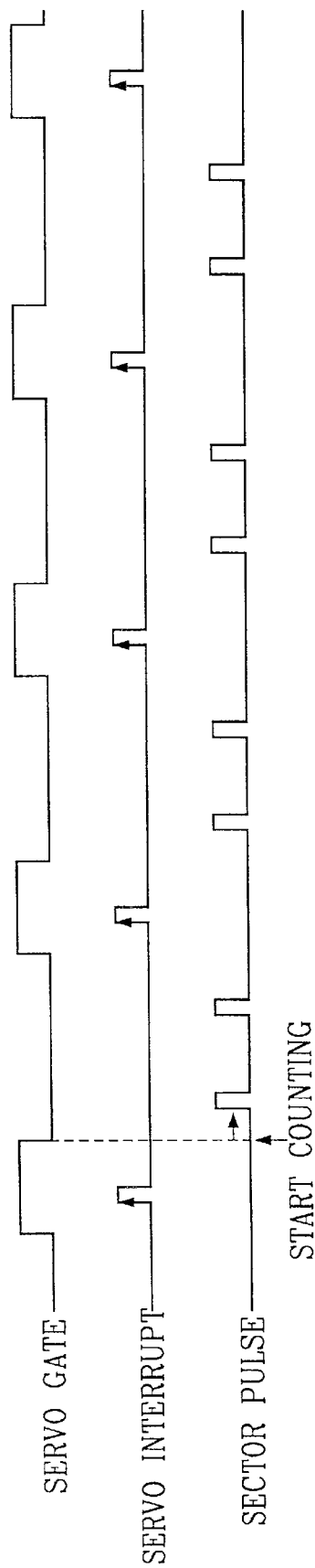
FIG. 2 is a timing diagram illustrating an earlier technique for generating sector pulses.

Generally, sector pulses are produced using software. FIG. 2 is a timing diagram illustrating an operation for generating sector pulses. In FIG. 2, the servo gate signal is a signal indicative of a servo zone. When a servo interrupt is generated during a high-level state of the servo gate signal, it is transmitted to a central processing unit (CPU) which, in turn, reads out a sector producing value from a random access memory (ROM). The CPU then loads the sector producing value in a register included in a sector pulse generating circuit. Under this condition, counting of input sector pulses is carried out from a negative edge of the servo gate signal. When the counted value is equal to the sector producing value, a desired output sector pulse is generated.

Figure 3:
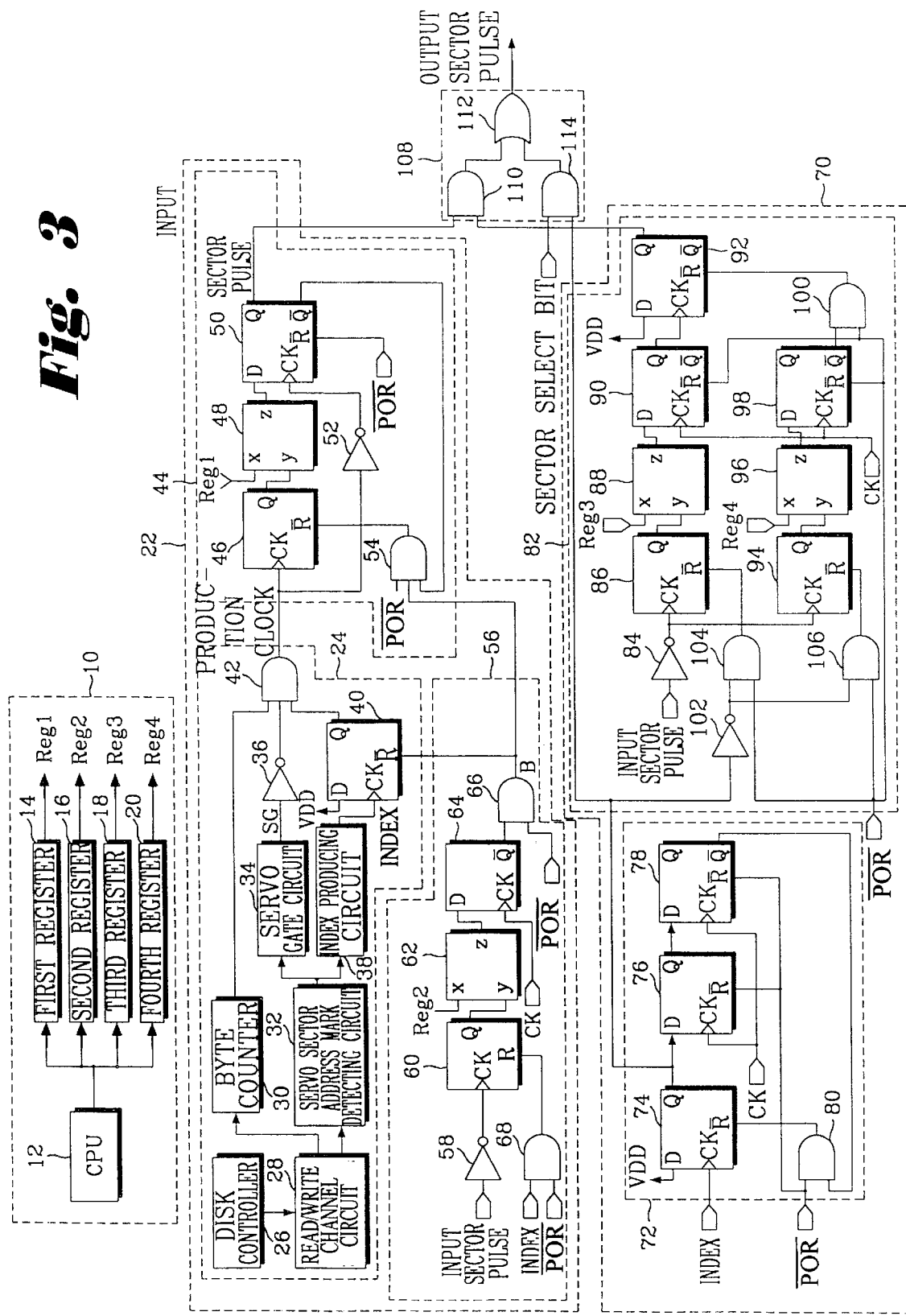
FIG. 3 is a block diagram illustrating a sector pulse generating circuit in accordance with an embodiment of the present invention.
Figure 4A:
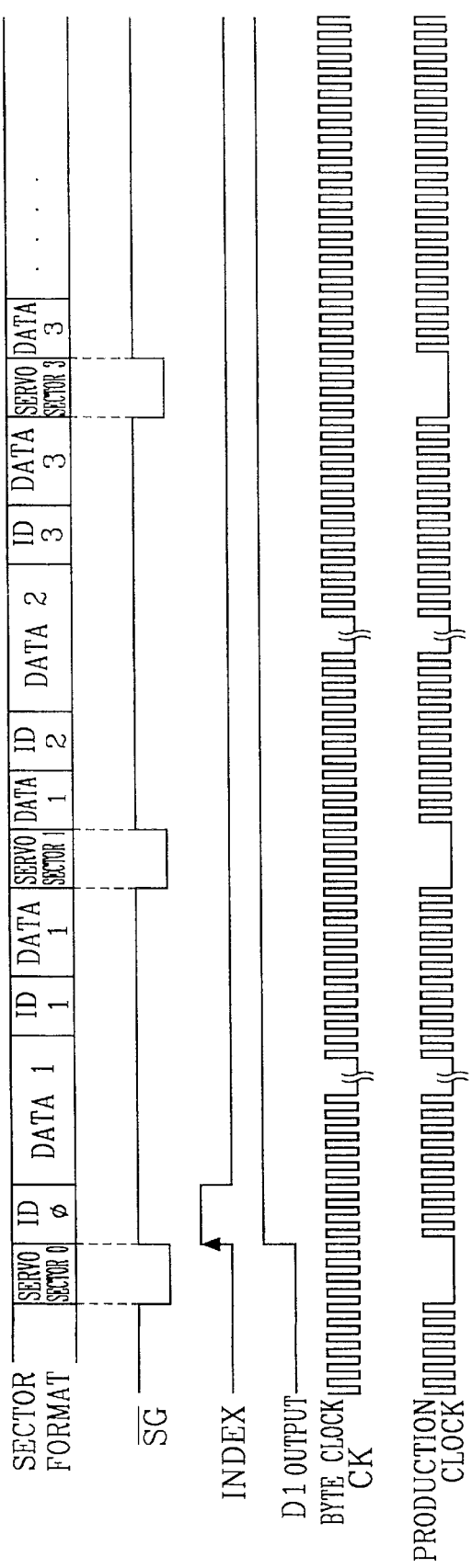
FIGS. 4A–4C are a timing diagram illustrating operations of parts of the sector pulse generating circuit shown in FIG. 3.
Figure 4B:
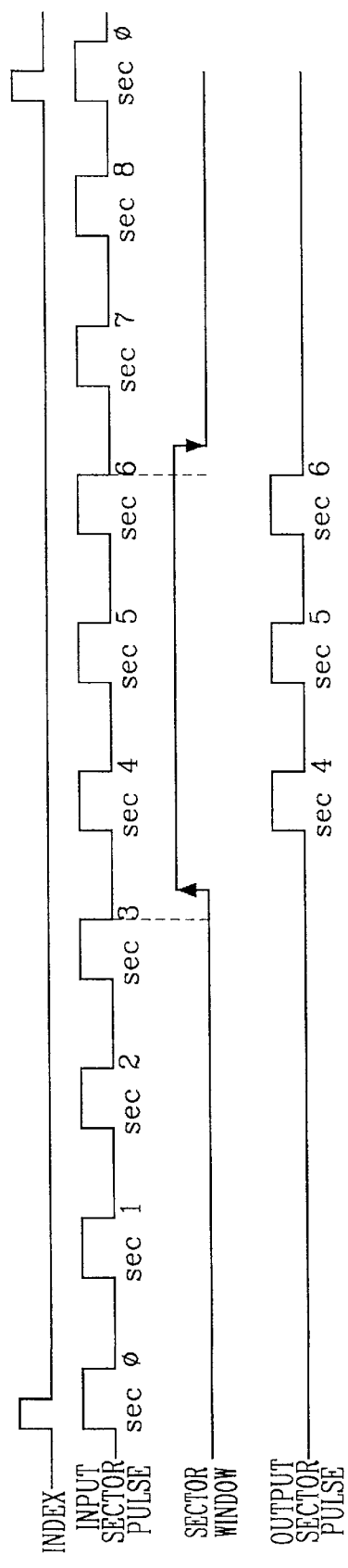
Figure 4C:
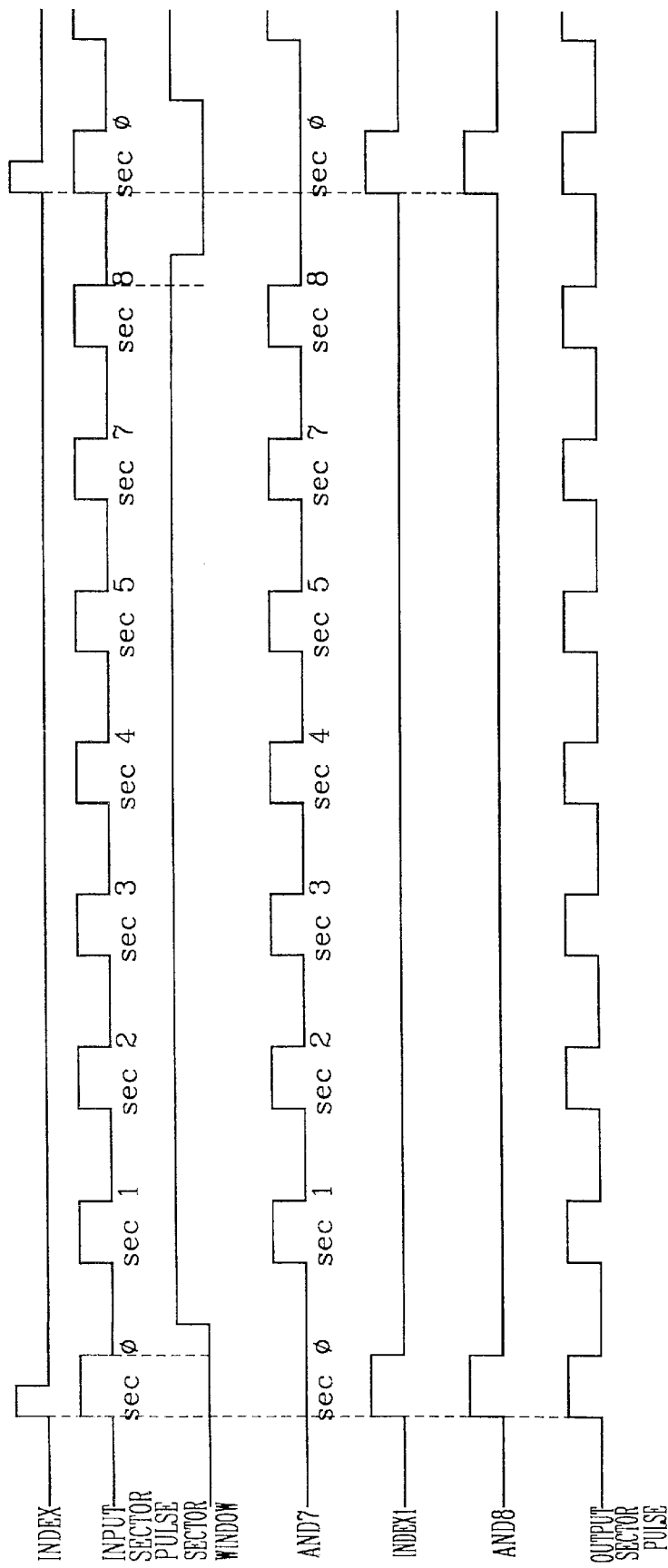

FIG. 3 is a block diagram illustrating a sector pulse generating circuit in accordance with an embodiment of the present invention. In addition, FIGS. 4A–4C are timing diagrams illustrating operations of essential parts of the sector pulse generating circuit shown in FIG. 3.

As shown in FIG. 3, the sector pulse generating circuit includes a controller 10, a sector pulse generator 22, a sector window producing circuit 70, and a sector pulse output circuit 108. The controller 10 includes a central processing unit (CPU) 12, and four registers 14, 16, 18 and 20. The sector pulse generator 22 includes a production clock producing circuit 24, a pulse generator 44 and a sector counter enable signal generator 56. The production clock producing circuit 24 includes a disk controller 26, a read/write channel circuit 28, a byte counter 30, a servo sector address mark detecting circuit 32, a servo gate producing circuit 34, a first inverter 36, an index producing circuit 38, a first D-flip flop 40, and a first three-input AND gate 42. Conventional elements are used for the disk controller 24, read/write channel circuit 28, byte counter 30, servo sector address mark detecting circuit 32, servo gate producing circuit 34 and index producing circuit 38. The pulse generator unit 44 includes a first counter 46, a first comparator 48, a second D-flip flop 50, a second inverter 52, and a second three-input AND gate 54. The sector counter enable signal generator 56 includes a third inverter 58, a second counter 60, a second comparator 62, a third D-flip flop 64, and a pair of AND gates 66 and 68. The sector window producing circuit 70 includes an index signal producing circuit 72 and a window signal producing circuit 82. The index signal producing circuit 72 of the sector window producing circuit 70 includes fourth to the sixth D-flip flops 74, 76 and 78, and a third AND gate 80. The window signal producing circuit 82 includes fourth and fifth inverters 84 and 102, third and fourth counters 86 and 94, third and fourth comparators 88 and 96, seventh to ninth D-flip flops 90, 92 and 98, and fourth to sixth AND gates 100, 104 and 106. The sector pulse output circuit 108 includes seventh and eighth AND gates 110 and 114, and an OR gate 112.

The operation of the sector pulse generator in accordance with the present invention will now be described in conjunction with FIGS. 3 and 4A–4C. The first register 14 of the controller 10 stores a length of each sector sent from the CPU 12. The length of each sector may be 512 bytes+α (jitter). The second register 16 receives the number of sectors of each track from the CPU 12 and stores it therein. The third register 18 receives a value indicative of the beginning of a target sector and stores it therein. If the value indicative of the beginning of a target sector is N, then the value stored in the third register 18 is "N–1". On the other hand, the fourth register 20 receives a value indicative of the end of a target sector and stores it therein. If the value indicative of the end of a target sector is M, then the value stored in the fourth register 20 is M.

The disk controller 26 included in the production clock producing circuit 24 of the sector pulse generator 22 produces a read gate signal and supplies it to the read/write channel circuit 28. A head signal is produced from a particular area on the magnetic disk in accordance with a read operation of the magnetic head of the hard disk driver. This head signal is supplied to the read/write channel circuit 28 which, in turn, shapes the waveform of the head signal using a differentiator (not shown). The read/write channel circuit 28 then produces an encoded read data (ERD) signal using a peak detector (not shown). The read/write channel circuit 28 also produces a read reference clock (RRCLK) signal for a particular zone. The ERD signal from the read/write channel circuit 28 is supplied to the servo sector address mark detecting circuit 32 whereas the RRCLK signal is supplied to the byte counter 30. Based on the RRCLK signal, the byte counter 30 produces a byte clock (CK) signal. Based on the ERD signal, the servo sector address mark detecting circuit 32 produces a servo address mark (SAM) signal. This SAM signal is sent to both the servo gate producing circuit 34 and the index producing circuit 38. The servo gate producing circuit 34 produces a servo gate (SG) signal based on the SAM signal. In accordance with the SAM signal, an index signal is produced from the index producing circuit 38.

The CK signal from the byte counter 30 is supplied to the first three-input AND gate 42. The SG signal is inverted by the first inverter 36 and then supplied to the first three-input AND gate 42. The index signal is supplied to the clock terminal CK of the first D-flip flop 40. Accordingly, the first D-flip flop 40 outputs a high-level signal because its input terminal D is coupled to a power supply source VDD. The output signal from the first D-flip flop 40 is fed to the first three-input AND gate 42. The first three-input AND gate 42 generates a high-level signal when all three signals supplied thereto are at a high level. This high-level signal generated by the first three-input AND gate 42 is a production clock. This production clock is supplied to the clock terminal CK of the first counter 46 included in the pulse producing circuit 44. The first counter 46 counts the production clocks and supplies the counted value to the input terminal y of the first comparator 48. The first comparator 48 also receives, at its input terminal x, data as to the sector length stored in the first register 14 of the controller 10. When the two values input to the input terminals x and y of the first comparator 48 are equal to each other, the first comparator 48 outputs a high-level signal at its output terminal z. The output signal from the first comparator 48 is fed to the input terminal D of the second D-flip flop 50. This second D-flip flop 50 also receives at its clock terminal CK the production clock which has been inverted by the second inverter 52. Accordingly, the second D-flip flop 50 outputs, at its output terminal Q, a sector pulse delayed by the inverted production clock when production pulses are counted to correspond to the sector length.

The sector pulse is supplied as an input sector pulse to the third inverter 58 of the sector counter enable signal generator 56. The third inverter 58 inverts the input sector pulse and supplies it to the second counter 60. This second counter 60 counts the input sector pulses and then feeds the counted value to the input terminal y of the second comparator 62. The second comparator 62 also receives, at its input terminal x, data as to the number of sectors per track stored in the second register 16 of the controller 10. When the two values input to the input terminals x and y of the second comparator 62 are equal to each other, the second comparator 62 outputs a high-level signal at its output terminal z. The output signal from the second comparator 62 is fed to the input terminal D of the third D-flip flop 64. This third D-flip flop 64 also receives the CK signal at its clock terminal CK. Accordingly, the third D-flip flop 64 outputs, at its output terminal, $\overline{Q}$, a low-level signal delayed for a delay time corresponding to the CK signal when the number of input sector pulses is equal to the number of sectors per track. The signal from the output terminal, $\overline{Q}$, of the third D-flip flop 64 is supplied to one input terminal of the first AND gate 66 which also receives an inverted power on reset ($\overline{POR}$) signal at the other input terminal thereof. The $\overline{POR}$ signal is a reset signal which is instantaneously generated when the main power is turned on. The first AND gate 66 generates a low-level B-signal when at least one of the two signals received in the first AND gate 66 is in a low state. This B-signal is supplied to the reset terminal, $\overline{R}$, of the first D-flip flop 40. Accordingly, the first D-flip flop 40 is reset when the number of input sector pulses is equal to the number of sectors per track. At this time, a low-level signal is output from the output terminal Q of the first D-flip flop 40. This output signal from the first D-flip flop 40 is supplied to the first three-input AND gate 42, so that the production clock producing circuit 24 produces no production clocks. Therefore, no production clocks are supplied to the first counter 46 of the pulse producing circuit 44.

When the sector pulse output from the output terminal Q of the second D-flip flop 50 is at a high state, a low-level signal is output from the output terminal, $\overline{Q}$, of the second D-flip flop 50. This low-level signal is supplied to the second three-input AND gate 54 which also receives the $\overline{POR}$ signal and the B-signal produced in the sector counter enable signal generating unit 56. When at least one of the three signals supplied to the second three-input AND gate 54 is at a low state, the second three-input AND gate 54 generates a low-level signal which is, in turn, sent to the reset terminal, $\overline{R}$, of the first counter 46. Since the B-signal is generated when the number of input sector pulses is equal to the number of sectors per track, the first counter 46 is reset in either case when the sector pulse input at the sector counter enable signal generator 56 is at a high state, when the number of sector pulses is equal to the number of sectors per track, or when the main power is turned on.

The fourth D-flip flop 74 included in the index signal producing circuit 72 of the sector window producing circuit 70 receives, at its clock terminal CK, the index signal generated by the index producing circuit 38 of flip production clock producing unit 24. The fourth D-flip flop 74 also receives a supply voltage VDD at its input terminal D. Accordingly, the fourth D-flip flop 74 outputs a high-level signal at its output terminal Q. The output signal from the fourth D-flip flop 74 is supplied to the input terminal D of the fifth D-flip flop 76. This fifth D-flip flop 76 also receives the CK signal at its clock terminal CK. Accordingly, the fifth D-flip flop 76 outputs, at its output terminal Q, the signal output from the output terminal Q of the fourth D-flip flop 74 after delaying it for a delay time corresponding to the CK signal. The output signal from the fifth D-flip flop 76 is then supplied to the input terminal D of the sixth D-flip flop 78. Since the sixth D-flip flop 78 also receives the CK signal at its clock terminal CK, it outputs, at its output terminal Q, the signal output from the output terminal Q of the fifth D-flip flop 76 after delaying it for a delay time corresponding to the CK signal. The third AND gate 80 receives the signal output from the output terminal, $\overline{Q}$, of the sixth D-flip flop 78 along with the $\overline{POR}$ signal. When at least one of the signals supplied to the third AND gate 80 is at a low state, the third AND gate 80 generates a low-level signal. This low-level signal is supplied to the reset terminal, $\overline{R}$, of the fourth D-flip flop 74. The signal output from the output terminal, $\overline{Q}$, of the sixth D-flip flop 78 is the signal generated by the output terminal Q of the fourth D-flip flop 74 and then output after being delayed for a delay time corresponding to two CK clock signals. Accordingly, the signal output from the output terminal Q of the fourth D-flip flop 74 is at a high state for a period of time corresponding to two CK clock signals. This signal is an index signal. In this case, the fifth and sixth D-flip flops 76 and 78 serve to adjust the pulse width of the index signal.

On the other hand, the sector pulse from the pulse producing circuit 44 is also supplied as an input sector pulse to the window signal producing circuit 82. In the window signal producing circuit 82, the input sector pulse is inverted by the fourth inverter and then supplied to the clock terminal CK of the third counter 86. This third counter 86 counts the input sector pulses and then feeds the counted value to the input terminal y of the third comparator 88. The third comparator 88 also receives, at its input terminal x, data as to the value indicative of the beginning of the target sector stored in the third register 18 of the controller 10. When the two values input to the input terminals x and y of the third comparator 88 are equal to each other, the third comparator 88 outputs a high-level signal at its output terminal z. The output signal front the third comparator 88 is fed to the input terminal D of the seventh D-flip flop 90. This seventh D-flip flop 90 also receives the CK signal at its clock terminal CK. The input sector pulse, inverted by the fourth inverter 84, is also supplied to the clock terminal CK of the fourth counter 94. This fourth counter 96 counts the supplied sector pulses and then feeds the counted value to the input terminal y of the fourth comparator 96. The fourth comparator 96 also receives, at its input terminal x, data as to the value indicative of the end of the target sector stored in the fourth register 20 of the controller 10. When the two values input to the input terminals x and y of the fourth comparator 96 are equal to each other, the fourth comparator 96 outputs a high-level signal at its output terminal z. The output signal from the fourth comparator 96 is sent to the input terminal D of the ninth D-flip flop 98. This ninth D-flip flop 99 also receives the CK signal at its clock terminal CK. An output signal from the output terminal, $\overline{Q}$, of the ninth D-flip flop 98 is supplied to the fourth AND gate 100 which also receives the $\overline{POR}$ signal. When at least one of the signals supplied to the fourth AND gate 100 is at a low state, the fourth AND gate 100 generates a low-level signal. This low-level signal is supplied to the reset terminal, $\overline{R}$, of the eighth D-flip flop 92. The eighth D-flip flop 92 also receives the supply voltage VDD at its input terminal D. Accordingly, the eighth D-flip flop 92 generates a high-level pulse when it receives a high-level signal output from the output terminal Q of the seventh D-flip flop 90. The signal output from the output terminal Q of the eighth D-flip flop 92 changes from a low level to a high level. When the eighth D-flip flop 92 receives, at its reset terminal, $\overline{R}$, the low-level signal from the output terminal, $\overline{Q}$, of the ninth D-flip flop 98, it is reset. The signal output from the output terminal Q of the eighth D-flip flop 92 changes from a high level to a low level. The signal output from the eighth D-flip flop 92 is a sector window signal. When the sector window signal is at a high state, it corresponds to the case wherein the counted value for the input sector pulses is equal to the value indicative of the beginning of the target sector. When the sector window signal is at a low state in accordance with the low-level signal output from the ninth D-flip flop 98, it corresponds to the case wherein the counted value for the input sector pulses is equal to the value indicative of the end of the target sector. Therefore, it can be understood that the sector window signal is a signal rising at the value indicative of the beginning of the target sector and descending at the value indicative of the end of the target sector. Meanwhile, the index signal output from the fourth D-flip flop 74 of the index signal producing circuit 72 is supplied to the fifth inverter 102 which, in turn, feeds the inverted index signal to both the fifth and sixth AND gates 104 and 106 which also receive the $\overline{POR}$ signal. When at least one of the signals supplied to the fifth and sixth AND gates 104 and 106 is at a low state, the fifth and sixth AND gates 104 and 106 produce low-level signals which are, in turn, supplied to the third and fourth counters 86 and 94, respectively. Accordingly, the third and fourth counters 86 and 94 are reset in either case when the index signal is at a low state or when the main power is turned on. The seventh and ninth D-flip flop 90 and 98 are reset when the main power is turned on upon receiving the $\overline{POR}$ signal at their reset terminals.

The sector window signal produced by the sector window producing circuit 70 is supplied to the seventh AND gate 110 of the sector pulse outputting unit 108 which also receives the input sector pulse produced by the sector pulse generating unit 22. When both the signals supplied to the seventeen AND gate 110 are at a high level, a high-level signal is generated by the seventh AND gate 110. The output signal from the seventh AND gate 110 is fed to the OR gate 112. The index signal produced by the index signal producing circuit 72 is also supplied to the eighth AND gate 114 of the sector pulse outputting circuit 108 which also receives a sector select bit from the CPU 12. When both the signals supplied to the eighth AND gate 114 are at a high state, a high-level signal is generated by the eighth AND gate 114. The output signal from the eighth AND gate 114 is supplied to the OR gate 112. This OR gate 112 generates a high-level signal when at least one of the two signals received therein is at a high state. This high-level signal output from the OR gate 112 is the sector pulse which is generated during the target zone.

The above operation will be described again in conjunction with the timing diagrams of FIGS. 4A to 4C.

FIG. 4A is a timing diagram illustrating the procedure of producing a production clock. In FIG. 4A, the signal, which is denoted by the reference character "$\overline{SG}$", is the servo gate signal generated by the servo gate producing circuit 34 and inverted by the first inverter 36. The signal, which is denoted by the reference character "INDEX", is the index signal produced by the index producing circuit 38. The output from the first D-flip flop 40 generated in accordance with the index signal is the signal which is denoted by the reference character "D1". The production clock shown in FIG. 4A is the high-level signal generated by the first three-input AND gate 42 when the $\overline{SG}$ signal, D1 signal and CK signal supplied to the first three-input AND gate 42 are all at a high state.

FIG. 4B is a timing diagram illustrating the procedure of generating sector pulses for target sectors. In association, with the procedure of generating sector pulses for target sectors, the values stored in the third and fourth registers 18 and 20, which will be supplied to the third and fourth comparators 88 and 90, respectively, are first described. In order to determine target sectors, the CPU 12 sets the value indicative of the beginning of the target sectors to "N". In this case, the CPU 12 controls the third register 18 to store a value of "N−1" therein. The CPU 12 also sets the value indicative of the end of the target sectors to "M" and controls the fourth register 20 to store the value of "M" therein. FIG. 4B shows the case wherein the first target sector number N is set to 4 whereas the last target sector number M is set to 6. In this case, the third register 18 has a value of 3 stored therein whereas the fourth register 20 has a value of 6 stored therein. When the number of input sector pulses counted by the third counter 86 of the window signal producing unit 82 is 3, the third comparator 88 outputs a high-level signal because the counted value, 3, is equal to the value stored in the third register 18. This signal output from the third comparator 88 is then delayed for a delay time corresponding to one byte clock, CK, by the seventh D-flip flop 90. The delayed signal output from the output terminal Q of the seventh D-flip flop 90 is supplied to the clock terminal CK of the eighth D-flip flop 92. Accordingly, a high-level signal is output from the eighth D-flip flop 92 because the supply voltage VDD is supplied to the input terminal D of the eighth D-flip flop 92. Therefore, the sector window signal rises in level as shown in FIG. 4B. When the number of input sector pulses counted by the fourth counter 94 of the window signal producing circuit 82 is 6, the fourth comparator 96 outputs a high-level signal because the counted value, 6, is equal to the value stored in the fourth register 20. This signal output from the fourth comparator 96 is then delayed for a delay time corresponding to one byte clock, CK, by the ninth D-flip flop 98. The delayed signal output from the output terminal, $\overline{Q}$, of the ninth D-flip flop 98 is supplied to the reset terminal R of the eighth D-flip flop 92. Accordingly, the sector window signal, which has been output at a high level from the eighth D-flip flop 92, descends. Meanwhile, a high-level signal is generated by the sector pulse outputting unit 108 only when the sector pulse from the second D-flip flop 50 and the window signal from the eighth-D-flip flop 92 both received at the seventh AND gate 110 are at a high state. Accordingly, sector pulses output from the sector pulse outputting unit 108 have the sector pulse form of FIG. 4B.

FIG. 4C is a timing diagram illustrating the procedure of generating sector pulses for all sectors. In this case, the first sector number N is set to 1. Accordingly, a value of 0 is stored in the third register 18, last sector number M is set to 8. This value, 8, is stored in the fourth register 20. Accordingly, the sector window signal rises after being delayed by one byte clock, CK, from the first input sector pulse corresponding to the first sector and descends after being delayed by one byte clock, CK, from the eighth input sector pulse corresponding to the eighth sector. This sector window signal is shown in FIG. 4C. When both the input sector pulse and sector window signal are at a high state, the seventh AND gate 110 generates a high-level signal. This signal from the seventh AND gate 110 is shown in FIG. 4C as the signal denoted by the reference character "AND7". Meanwhile, a sector select bit is supplied to the CPU 12 in order to output the first sector pulse of the input sector pulse signal. When both the index signal and sector select bit supplied to the eighth AND gate 114 are at a high state the eighth AND gate 114 generates a high-level signal. This signal output from the eighth AND gate 114 corresponds to a signal AND8 shown in FIG. 4C. The output signals, AND7 and AND8, from the seventh and eighth AND gates 110 and 114 are supplied to the OR gate 112. When at least one of the signals supplied to the OR gate 112 is at a high slate, a high-level signal is generated from the OR gate 112. This signal corresponds to a sector pulse output shown in FIG. 4C.

As apparent from the above description, the present invention provides a technique for generating sector pulses using hardware, thereby reducing the load supplied to the CPU. Accordingly, there is an advantage in that an overload involved in generating sector pulses using software can be eliminated.

Although the preferred embodiments of the invention have been disclosed for illustrative purposes those skilled in the art will appreciate that various modifications, additions and substitutions are possible, without departing from the scope and spirit of the invention as recited in the accompanying claims.

What is claimed is:

1. A method of generating sector pulses in a hard disk drive, comprising the steps of:

receiving read reference clock signals produced during a read operation of the hard disk drive and producing a byte clock signal in sync with every byte;

detecting a time interval in which no servo gate signal indicative of a servo zone on a magnetic disk of the disk drive is produced;

outputting the byte clock signal as an effective production clock signal during said time interval in which no servo gate signal indicative of a servo zone on a magnetic disk of the hard disk drive is produced;

counting the production clock signals; and comparing the counted value obtained during the production clock signal counting step with a previously stored value indicative of a sector length and generating a sector pulse when the counted value is equal to the previously stored value.

2. The method in accordance with claim 1, further comprising the steps of:

counting the sector pulses produced during the sector pulse generating step; and comparing the counted value obtained during the sector pulse counting step with a previously stored value indicative of a track length, clearing the counted value for the production clock, and again executing the production clock counting step.

3. The method in accordance with claim 2, further comprising the steps of:

checking whether or not an index signal has been produced; and clearing the counted value obtained during the sector pulse counting step when it is determined that the index signal has been produced, and secondarily executing the sector pulse counting step.

4. The method in accordance with claim 1, further comprising the steps of:

counting the sector pulse produced during the sector pulse generating step;

receiving values respectively indicative of the beginning and end of a target zone requiring a production of sector pulses;

comparing the counted value obtained at the sector pulse counting step with the value indicative of the beginning of the target zone, starting a production of a window signal when the counted value is equal to the value indicative of the beginning of the target zone, comparing the counted value obtained during the sector pulse counting step with the value indicative of the end of the target zone, and completing the production of the window signal when the counted value is equal to the value indicative of the end of the target zone; and outputting sector pulses produced during the production of the window signal as effective sector pulses.

5. The method in accordance with claim 3, further comprising:

checking whether or not an index signal has been produced; and clearing the counted value obtained during the sector pulse counting step when it is determined that the index signal has been produced, and again executing the sector pulse counting step.

6. A sector pulse generating circuit in a hard disk drive comprising:

a disk controller for producing a read gate signal;

a read/write channel circuit for receiving the read gate signal from the disk controller and a head signal supplied from a magnetic head of the hard disk drive and producing encoded read data and for read reference clock signals based on the received signals;

a servo sector address mark detecting circuit for receiving the encoded read data from the read/write channel circuit and for producing a servo address mark signal;

an index producing unit for receiving the servo address mark signal from the servo sector address mark detecting circuit and for producing an index signal;

a servo gate producing circuit for receiving a servo address mark signal from the servo sector address mark detecting circuit and for producing a servo gate signal;

a byte counter for receiving the read reference clock signals from the read/write channel and for producing a byte clock signal in sync with every byte;

a time interval detector for detecting a time interval in which no servo gate signal is produced;

a production clock output circuit for outputting the produced byte clock signal as an effective production clock signal during said time interval detected by said time interval detector in which no servo gate signal is produced;

a production clock signal counter for counting the production clock signals;

a controller for producing a value indicative of a sector length of a magnetic disk of the hard disk driver;

a first register for receiving and storing the value indicative of the sector length from the controller;

a first comparator for comparing the counted value output from the production clock signal counter with the sector length value stored in the first register; and a sector pulse output circuit for outputting a sector pulse when the two values compared in the first comparator are equal to each other.

7. The sector pulse generating circuit in accordance with claim 6, further comprising:

a first sector pulse counter for counting the sector pulse output from the sector pulse output circuit;

the controller producing a value indicative of a track length of the magnetic disk;

a second register for receiving and storing the value indicative of the track length from the controller;

a second comparator for comparing the counted value output from the first sector pulse counter with the track length value stored in the second register; and a first clear signal producing circuit for producing a first clear signal for clearing the counted value output from the production clock counter when the two values compared in the second comparator are equal to each other.

8. The sector pulse generating circuit in accordance with claim 7, further comprising:

a second clear signal producing circuit for receiving the index signal from the index producing circuit and for producing a second clear signal for clearing the counted value output from the first sector pulse counter.

9. The sector pulse generating circuit in accordance with claim 7, further comprising:

a second sector pulse counter for counting the sector pulse output from the sector pulse output circuit;

the controller producing values respectively indicative of the beginning and end of a target zone requiring a production of sector pulses;

a third register for receiving and storing the values indicative of the beginning and end of the target zone from the controller;

a third comparator for producing a start signal when the counted value output from the second sector pulse counter is equal to the value, indicative of the beginning of the target zone, stored in the third register and for producing an end signal when the counted value output from the second sector pulse counter is equal to the value, indicative of the end of the target zone, stored in the third register;

a window output circuit for receiving the start and end signals output from the third comparator, and for outputting a window signal which starts in sync with the start signal and which ends in sync with the end signal; and a target sector pulse output circuit for outputting sector pulses produced during the production of the window signal as effective sector pulses.

10. The sector pulse generating circuit in accordance with claim 9, further comprising:

a third clear signal producing circuit for receiving the index signal from the index producing circuit and for producing a third clear signal for clearing the counted value output from the second sector pulse counter.

* * * * *